(12) United States Patent
Boyd (10) Patent No.: US 11,571,354 B2
(45) Date of Patent: Feb. 7, 2023

(54) WALKER SPECIALIZED FOR TRAIL USE

(71) Applicant: Jack Boyd, Las Vegas, NV (US)

(72) Inventor: Jack Boyd, Las Vegas, NV (US)

(*) Notice: Subject to any disclaimer, the term of this patent is extended or adjusted under 35 U.S.C. 154(b) by 451 days.

(21) Appl. No.: 16/551,428

(22) Filed: Aug. 26, 2019

(65) Prior Publication Data

US 2021/0059890 A1 Mar. 4, 2021

(51) Int. Cl.
| | | |
|---|---|---|
| *A61H 3/04* | (2006.01) | |
| *B62K 3/16* | (2006.01) | |
| *B62K 3/02* | (2006.01) | |
| *B62K 11/02* | (2006.01) | |
| *B62K 15/00* | (2006.01) | |
| *B62J 7/00* | (2006.01) | |

(52) U.S. Cl.
CPC .................. *A61H 3/04* (2013.01); *B62K 3/02* (2013.01); *B62K 3/16* (2013.01); *B62K 11/02* (2013.01); *B62K 15/006* (2013.01); *A61H 2003/043* (2013.01); *A61H 2003/046* (2013.01); *A61H 2201/0161* (2013.01); *A61H 2201/164* (2013.01); *A61H 2201/1633* (2013.01); *A61H 2201/1635* (2013.01); *B62J 7/00* (2013.01); *B62K 2204/00* (2013.01)

(58) Field of Classification Search
CPC .......... A61H 3/04; A61H 3/043; A61H 3/046; A61H 2003/006; A61H 2201/164; A61H 2003/046; B62K 3/16; B62K 9/00; B62B 3/009
USPC ....................................................... 280/7.17
See application file for complete search history.

(56) References Cited

U.S. PATENT DOCUMENTS

| | | | | |
|---|---|---|---|---|
| 2,926,927 | A  * | 3/1960 | Enright | B62B 3/009 280/87.021 |
| 7,025,362 | B1 * | 4/2006 | Gomez | B62B 3/001 280/47.11 |
| 7,900,940 | B1 * | 3/2011 | Vidmar | A61H 3/04 280/87.021 |
| 8,998,223 | B2 * | 4/2015 | Chang | F16D 59/02 280/87.021 |
| 2009/0224499 | A1 * | 9/2009 | Dashew | A61H 3/04 280/87.05 |
| 2010/0012696 | A1 * | 1/2010 | Prager | B62J 9/22 224/417 |
| 2014/0319792 | A1 * | 10/2014 | Miller | A61H 3/04 280/87.041 |
| 2019/0031271 | A1 * | 1/2019 | Zhang | B62J 1/08 |
| 2021/0016854 | A1 * | 1/2021 | Thompson | B62K 15/006 |

FOREIGN PATENT DOCUMENTS

| | | | | | |
|---|---|---|---|---|---|
| CN | 107364528 | A | * | 11/2017 | |
| CN | 109665014 | A | * | 4/2019 | |
| DE | 202009001418 | U1 | * | 4/2009 | ............... B62K 3/16 |
| DE | 202014003789 | U1 | * | 5/2014 | ............... A61H 3/04 |

* cited by examiner

*Primary Examiner* — Daniel J Colilla
(74) *Attorney, Agent, or Firm* — Nolan IP Law; Jason M. Nolan (57) ABSTRACT

A walker specialized for use on trails by pushing and walking, rather than riding on, with no drivetrain is provided. The walker can include a frame, two inline wheels, and a handlebar steering mechanism. The walker can further include a braking mechanism, an elbow rest, an electric motor, and racks and/or carriers for gear.

25 Claims, 3 Drawing Sheets

WALKER SPECIALIZED FOR TRAIL USE

CROSS-REFERENCE TO RELATED APPLICATIONS

This application claims the benefit of U.S. Provisional Application No. 62/765,415, filed Aug. 25, 2018, the disclosure of which is incorporated herein by reference.

FIELD OF THE INVENTION

The present invention relates to walkers that are specialized for rugged trail use by handicapped and non-handicapped persons. These walkers of the invention will provide walking assistance for handicapped people who require walking assistance and for non-handicapped people who need walking assistance while carrying items and gear. Other walkers of the invention are specialized for use on non-rugged trails, paved walkways and in buildings. Other walkers of the invention have electrical assist to assist the pushing burden, especially for uphill and level travel.

BACKGROUND

Degenerative changes of the spine are seen in 95% of people by the age of 50 years. A common spinal degeneration is lumbar spinal stenosis (LSS). This is a narrowing and pinching of the nerves that come through the spinal foramen at the nerve roots. The incidence of LSS in the United States has been estimated at about 10 percent of the population. As the "baby boomers" age, an estimated 2.4 million Americans will be affected by LSS by 2021.

Burning pain in buttocks or legs (sciatica) frequently occurs with LLS and other spinal disorders. Pressure on spinal nerves can result in pain in the areas that the nerves supply. The pain may be described as an aching or a burning feeling. It typically starts in the area of the buttocks and radiates down the leg. As it progresses, it can result in pain in the foot. Numbness or tingling in buttocks, feet or legs is another common symptom. As pressure on the nerve increases, numbness and tingling often accompany the burning pain, although not all sufferers of LLS will have all of those symptoms.

The medical literature documents that less pain often occurs with leaning forward called forward lumbar flexion while standing or sitting. Studies of the lumbar spine show leaning forward can increase the space available for the nerves exiting the spine and thusly relive pain. Many sufferers of LLS may note immediate relief when leaning forward and sitting. Pain is usually made worse by standing and walking. Some patients note that they can ride a bicycle or walk leaning on a shopping cart for long periods of time, many hours, with little or no pain, but walking without leaning forward support for more than a few minutes often brings on severe, unbearable leg and back pain.

Forward lumbar flexion, accomplished by leaning forward on something like a shopping cart, opens the spine and may reduce nerve compression and pain symptoms. The North American Spine Society (NASS) has released a set of recommendations that stress the utilization of conservative methods of treatment, such as assisted walking, before considering surgery which is both costly and dangerous. The Journal of Family Practice (Goldman et. al., *Journal of Family Practice*, V57, pp 257-260, April, 2008), which is incorporated herein by reference, recommends using a four or three wheeled walker, with the leaning forward position. In this study, 87% of patients reported relief during walking using a 3- or 4-wheeled walker and a leaning forward position. Besides spinal disorder sufferers, other persons will benefit from the present invention. For example, older people are no longer able to carry as much weight as they did when younger because of other joint related disorders, such as osteoarthritis and osteoporosis, being older in general, and faster fatigue than when younger. Any weight carrying medical conditions will be improved by not carrying weight as carried when using a backpack and will be benefited by the walkers of the invention.

Physical activity is especially beneficial in persons over 50 and physical activity will be encouraged by walking assist devices such as the walkers of the invention. Physical activity can keep the body and mind strong. Therefore, older persons need devices to assist walking and exercise, especially suffers of spinal conditions such as LLS where walking a short distance causes pain, and sufferers of other disorders, for example, weight carrying disorders, arthritis, osteoporosis, limb loss and easy fatigue.

While 3- and 4-wheeled walkers with non-inline wheels can relieve walking related pain, those walkers are not suitable for many activities desired by active persons. For example, standard 3- and 4-wheeled walkers are not suitable to carry weight on rugged trails because the wheels are not inline, they have a narrow front to back wheelbase, and they are difficult if not impossible to manipulate over rugged terrain. Many over 40 years old sufferers of walking problems, especially those that have led an active life, would like a walker that increases their activities beyond the capability of standard 3- and 4-wheeled walkers. A walker to reduce weight on the body while backpacking would allow handicapped persons or persons with weight carrying disorders to increase their use of rugged and non-rugged trails and walkways.

Another problem with standard 3- or 4-wheeled walkers is that they are slow and cumbersome in airports and public areas. For example, they can't carry many items and gear, such as, luggage, supplies, clothing, shelter, gear, water, food, weapons, and the like. The walkers of the invention are much more nimble the standard 3- or 4-wheeled walkers and they are designed to carry weight.

Wheeled trail devices are available as "game carts", for carrying hunting gear into and out of rugged areas. However, one or two wheeled game carts are specialized for hunting and are not specialized for handicapped persons walking on trails and walkways, persons seeking walking assistance on trails, weight carrying on trails, or for backpacking. For example, they do not allow the forward lumbar flexion-accomplished by leaning forward and leaning on something to reduce weight and provide relief for LLS sufferers. Some game carts don't have inline wheels.

Push bicycles are known, but they are child's toys, such as scooters. There are no walkers specialized for rugged and non-rugged trail use and walkway use with two wheels inline to make the walker less cumbersome, more nimble, and ease trail use, or specialized for handicapped walking assistance on trails while pushing and walking and carrying items and gear. There are no walkers with two wheels inline that are specialized to reduce weight on the back and spine, and reduce fatigue. There are no walkers with two wheels inline specialized for rugged trail use to carry items and gear, such as, luggage, supplies, clothing, shelter, gear, water, food, weapons, and the like.

SUMMARY

The present invention is a walker specialized for trail use with two inline wheels, with a breaking mechanism, with a handlebar steering mechanism, with no drivetrain for non-electrical motor embodiments, and with optional racks and optional carriers for items and gear. The walkers of the invention are specialized for pushing and walking rather than riding-on although they optionally may be ridden-on in some coasting situations, for example, going downhill. The walkers of the invention have no drivetrain unless they have an electrical assist motor. Because the walkers of the invention are specialized for pushing rather than riding-on, they can be lower weight than standard ride-on bicycles. The walkers of the invention are for persons desiring walking assistance for a variety of reasons, for example, handicapped persons or non-handicapped persons who want to use trails or who want to use trails while transporting items and gear. The walkers of the invention provide support and forward lumbar flexion while walking and while walking transporting items and gear which can relieve pain and reduce fatigue. Embodiments of the present invention are walkers used by persons with walking concerns or walking limitations, handicapped or non-handicapped, who want assistance while walking or who want assistance while walking while transporting items and gear with less pain, with less fatigue, with greater support, and with less items and gear carried on the body.

Embodiments of the present invention are walkers used to provide walking assistance and support over more rugged terrain than possible with current 3- or 4-wheel walkers or carts. walkers used to provide walking assistance to both handicapped and non-handicapped persons on rugged trails. Other embodiments of the present invention are walkers specialized for use on non-rugged trails, on paved walkways and in buildings. Other embodiments of the walker of the invention have an electrical assist motor. A walker of the invention with an electrical assist motor will not have pedals as part of the drivetrain because it is for walking and pushing and not riding-on.

DESCRIPTION OF EMBODIMENTS

In this patent the word "and" can also mean "or" and "or" can also mean "and". Plural can also mean singular and singular can mean plural.

A "handicapped person" as discussed herein is a person that is unable to comfortably walk unaided for long distances, for example, approximately five miles or less or is unable to walk unaided while carrying weight, for example, a person with spinal stenosis, other joint disorders, arthritis, spinal disorders, limb loss, hip, back, spine, foot, ankle, shoulder, neck, knee disorders, or weight carrying restrictions. A handicapped person of this invention is a person with any weight carrying restrictions. Many persons have medical weight carrying restrictions at, for example, 50 pounds, or 25 pounds, or 10 pounds and these persons would be considered handicapped. The walker of the invention will benefit handicapped persons in walking and walking while transporting items and gear.

Embodiments of the present invention are walkers specialized for trail use. A trail means an unpaved walkway which can be steep, narrow, or rugged or can be smooth, open or non-rugged and anything between. The walkers of the invention have two inline wheels, a handlebar steering mechanism, a breaking mechanism, no drivetrain for non-electrical motor assist embodiments, and optional racks and optional carriers for transporting items and gear. Embodiments of the walkers of the invention are further specialized for pushing and walking rather than riding on so they have no drivetrain for non-electrical motor assist embodiments. What is meant by a standard or ride-on bicycle are the common bicycles in wide use that have pedals and a drivetrain to transmit leg or arm power to the wheels. A wide variety of ride-on bicycles designs for a wide variety of uses are known in the ride-on bicycle art.

Since the walker of the invention is specialized for pushing and not ridding-on many of the specialized features of the walker of the invention will differ from a ride-on bicycle. For example, embodiments of the walkers of the invention can be lighter than a ride-on bicycle because the walkers of the invention have no drivetrain for non-electrical motor assist embodiments and have no pedals. A pedal is each of a pair of foot-operated levers used for powering a bicycle propelled by the arms or legs. A bicycle drivetrain is the pedals, chain, belts or gears used to transmit power from the pedals to the wheels. The walker of the invention also does not need the structural weight associated with balancing and carrying a person. Other embodiments of the walker of the invention can carry items and gear in locations that would be impractical for a ride-on bicycle.

For example, a fully loaded backpack for a backpacker might weigh 50 lbs., and that load could be transported by a backpacker but only with great effort. That same 50 lbs. placed on a walker of the invention could be transported with a fraction of the effort, thus providing walking and item and gear carrying assistance to both handicapped and non-handicapped persons. The gear and items carried using a walker of the invention would allow more gear and items to be transported greater distances with less fatigue than possible using a backpack.

Other embodiments of the invention are walkers specialized for use on non-rugged trails, on paved walkways and in buildings. Walkers of the invention specialized for non-rugged trails, paved walkway and buildings can be of less rugged construction than walkers of the invention specialized for rugged trail use. Other embodiments of the walker of the invention specialized for use on non-rugged trails, on paved walkways and in buildings optionally can carry items and gear. Walkers of the invention specialized for non-rugged trails, paved walkways and building will have two inline wheels, a handlebar steering mechanism, a breaking mechanism, no drivetrain for non-electrical motor assist embodiments, and optional racks and optional carriers for transporting items and gear.

The phrase "walker of the invention" means a walker similar to a ride-on bicycle that is specialized for trail and walkway use while pushing rather than riding on. The walkers of the invention have two inline wheels, a handlebar steering mechanism, a breaking mechanism, no drivetrain for non-electrical motor assist embodiments and optionally racks and carriers for transporting items and gear. Other embodiments of the walker of the invention have an electrical assist motor. A walker or the invention with an electrical assist motor will not have pedals as part of the drivetrain but will have all the rest of the specifications detailed herein specifically two inline wheels, a handlebar steering mechanism, a breaking mechanism, and optionally racks and carriers for transporting items and gear.

Figure 1:
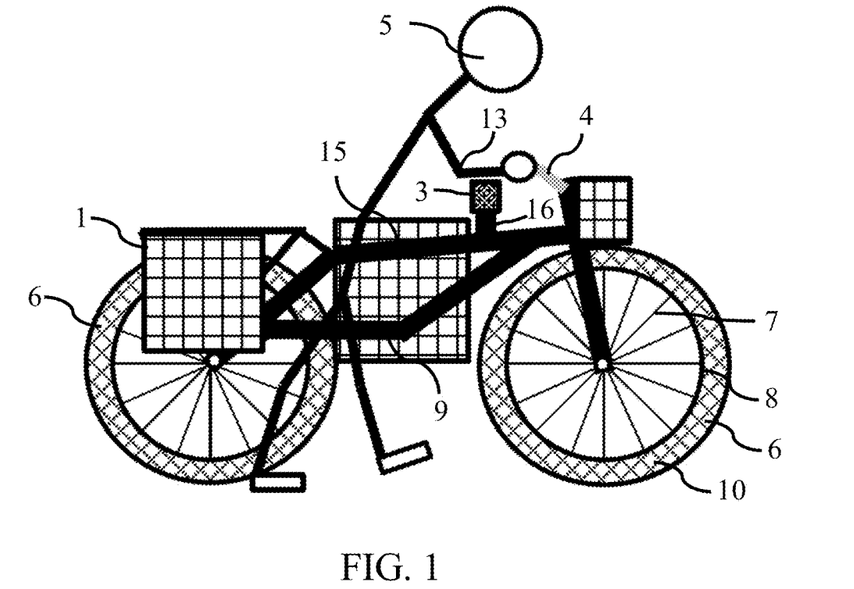
FIG. 1 shows a side view of a walker, in accordance with embodiments disclosed herein.
Figure 2:
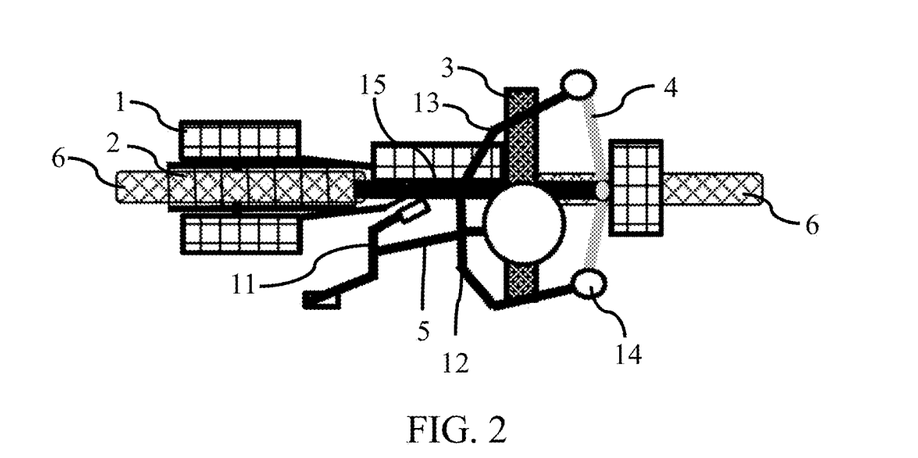
FIG. 2 shows a top view of the walker of FIG. 1.

The drawings in FIGS. 1-4 show embodiments of a walker of the invention and an operator 5. The operator is shown in a leaning forward position with hands 14 on the handlebar 4 and in front of the operator's hips by about 30 inches. Possible placements of optional item and gear carriers 1 are shown in the figures. The optional elbow rest 3 is shown near the operator's elbows. Non-limiting locations of the optional racks 2 and optional item and gear carriers 1 are shown in FIGS. 1 and 2, but and other locations are contemplated. A frame 9 structure is shown, but it is not intended to limit the frame design in any way. FIGS. 1-4 show exemplary embodiments and are not meant to be limiting the walkers of the invention in size, design, frame design, wheel size, wheel location, steering mechanism size of location, or the locations or type of frame or frame support structure, or limit item and gear carriers 1 number or locations on the walker of the invention.

A "component" of the walker of the invention is any part of the walker except the frame structure. Some embodiments of the walker of the invention may allow some riding-on while operated on downhill or flat surfaces and trails using, for example, a foot rest or a seat while coasting. However, most operation especially uphill operation will use pushing for locomotion. The walkers of the invention do not have a drivetrain for non-electrical motor assist embodiments and are powered by pushing and optionally coasting. The "centerline" of the walker of the invention is the line drawn between the two wheels supporting walker. The two wheels 6 supporting the walker of the invention are shown in FIGS. 1-4. The phrase "two inline wheels" means that the walker of the invention will have a front and back wheel that are inline in the direction of travel and placed approximately as shown in FIGS. 1-4. A walker of the invention will have a front and back wheel with the weight of the walker and weight of any carried items or gear primarily on the front and back wheels with the weight of the walker and carried items and gear centered about midway between the front and back wheels which is typical of a ride-on bicycle. The front and back wheels of the walker of the invention can be offset a bit offline of the centerline and still be within the scope of the claims. Auxiliary wheels can be present and still be within the scope of the claims, and non-limiting examples are training wheels, small wheels touching the ground or wheels not touching the ground.

What is meant by handlebar steering mechanism is a handlebar attached to the front wheel to control the direction of the front wheel and direction of walker travel. The handlebar steering mechanisms used on walkers of the invention are the same or similar to the steering mechanisms used on ride-on bicycles a wide variety of which are known in the ride-on bicycle art. The leaning forward and weight supported on the walker of the invention can be accomplished by the handlebar 4 alone. This allows sufferers of LLS and the other medical conditions mentioned previously to walk with less or no pain. The stick figure (operator) 5 is shown in a leaning forward position with the shoulders 12, elbows 13 and hands 14 significantly in front of the hips 11 with the hands holding the handlebars 4. In FIGS. 1 and 2, the shoulders 12 are about 12 inches in front of the hips, the elbows 13 about 20 inches in front of the hips, and the hands 14 about 30 inches in front of the hips. This is the leaning forward position that greatly benefits LLS suffers and can only be attained by forward lumbar flexure and by transferring significant weight to the walker handlebars 4. For example, the human/stick figure (operator) 5 in FIGS. 1-3 in that particular stance on a level surface would transfer about 10% to 20% of their body weight to the walker. Placing significant body weight on the walker is "leaning on the walker." Leaning on the walker will allow travel with less fatigue, and especially, will allow persons transporting items and gear on the walker to do so with less fatigue. A leaning on position reduces weight on the back and spine and may reduce nerve pinching and other spinal and lower body weight problems.

Figure 3:
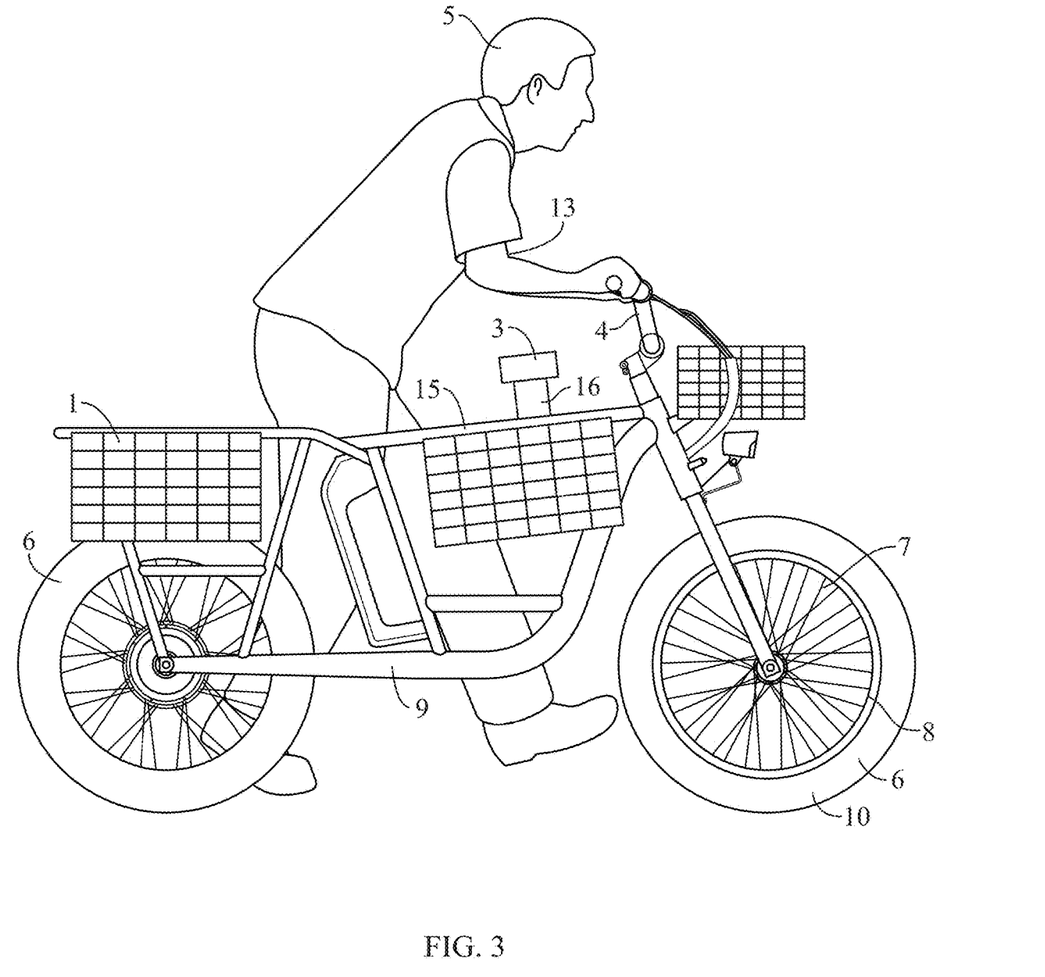
FIG. 3 shows a side view of a walker, in accordance with embodiments disclosed herein.

Embodiments of the walker of the invention provide a leaning forward, pushing position which can potentially provide pain and fatigue relief. This may be enabled by just the handlebars 4, which allows a leaning forward position and weight to be transferred to the walker of the invention. FIGS. 1-3 show an example of elbow rest 3 location. If an optional elbow rest is used it can be part of the handlebar steering mechanism or separate. The handlebars 4 allow a leaning forward position and enable weight to be transferred to the walker of the invention, like leaning on a shopping cart in a store. If present, the optional elbow rest 3 can also enable weight to be transferred to the walker of the invention.

The walker of the invention will also benefit non-handicapped persons transporting items and gear with greater ease and less fatigue by providing transport of the items and gear on the walker rather than in a backpack or other weight carrying devices wheeled or not wheeled.

Embodiments of the walker of the invention specialized for rugged trail are a walker is well-specialized, well-constructed and lightweight. Such specialization might enable uphill and downhill travel with greater ease and with less fatigue.

Embodiments of the walkers of the invention differ in significant respects from standard 3- and 4-wheeled walkers designed for handicapped persons or persons needing walking assistance. For example, the walkers of the invention have two inline wheels, they have a longer front to back wheelbase, they have a narrower track, they can optionally carry more items and gear, the operator is positioned between the wheels of the wheelbase for stability, and they are specialized for rugged and non-rugged trail, city walkways and building use. The wheelbase is defined as the distance between the hubs of the two wheels supporting the walker. The preferable wheelbase is between 15 inches and 60 inches. Embodiments of the wheelbase of the walker of the invention can vary depending on specific use requirements.

Other embodiments of the invention provide walking assistance to anyone using a rugged or non-rugged trail or backpacking. Using a backpack on rugged trails is traditional, but backpack carrying is hazardous. Everyone is susceptible to weight bearing injury acute and long term. Therefore, the walker of the invention provides advantages for anyone needing to transport items and gear while walking. Non-limiting examples of items are luggage, supplies, clothing, shelter, gear, water, food, weapons, and the like. The walker of the invention may prevent or decrease joint and other weight bearing injuries and accidents, for example knee, leg, foot, ankle, back, shoulder and hip injury by providing walking support and packing weight on the walker of the invention rather than carrying in a backpack, bodypack, hip pack, shoulder pack and the like. For example, sprained or broken ankles, a common walking injury are more likely when carrying and manipulating weight over rugged terrain. The inline walker of the invention allows more gear and items to be carried and more safely while walking. For example, extra water can be carried in desert areas providing additional safety. Being able to carry more items and gear on rugged trails using the walker of the invention allows carrying more safety equipment, for example, communication devices and other safety equipment.

Handicapped focused 3- and 4-wheeled walkers have a standalone design to help with side-to-side balance. The walker of the invention sacrifices that side-to-side balance for greater front-to-back balance because of the longer front to back wheelbase, narrow track and typically larger wheels. The narrow track of inline wheels of the walker of the invention eases travel on uneven surfaces and over rocks on rough trails and on narrow trails. Inline wheels and larger wheels can also allow for faster travel compared to 3- and 4-wheeled walkers. That front-to-back balance and narrow track may provide greater efficiency in travel over rough or smooth surfaces compared to 3- and 4-wheeled walkers. The walker of the invention will carry items and gear with lower effort and better balance because of the longer wheelbase and narrower track compared to a standard 3- or 4-wheeled walker. The carried items and gear are distributed along the length of the wheelbase and not positioned as high as they are, for example, on a backpack which lowers the center of gravity which improves balance and safety. The walker of the invention weight and weight of items and gear is stabilized by the longer wheelbase and lower center of gravity especially when going uphill and downhill as well as on flat surfaces. Non-limiting examples of positions of the carriers 1 of items and gear are shown in FIGS. 1-4. However, the illustrations are an example and not meant to be limit carriers 1 numbers or locations on the walker of the invention.

Walkers of the invention differ from ride-on bicycles in many ways, for example, walkers of the invention do not have a drivetrain for non-electrical motor assist embodiments to power the walker. A ride-on bicycle is a standard bicycle of a multitude of designs and uses with a pedal operated drivetrain to power locomotion. Ride-on bicycle drivetrains are of a wide variety of different designs a wide variety of which are known in the ride-on bicycle art. Drivetrains for ride-on bicycles can be human powered or electrically powered. The walkers of the invention are specialized for pushing to power locomotion whether electrical motor assisted or not electrical motor assisted. On downhill or level travel, the walkers of the invention may be ridden on in certain conditions, e.g., where pushing is not needed for locomotion, such as going downhill.

Embodiments of the handlebar steering mechanism of the walker of the invention are on the walker centerline and centered near to the front wheel center as they typically are on a ride-on bicycle. Since the walker of the invention is specialized for pushing and support rather than riding on, embodiments may have the handlebars offset from the centerline to provide specialization for pushing and trail use. Embodiments of the elbow rest, if present, may be separate from the handlebars, or may be part of the handlebar steering mechanism. Most embodiments of the handlebar steering mechanism and elbow rest of the invention will be centered on the centerline, but some embodiments may have an elbow rest offset from the centerline.

Some embodiments of the walker of the invention are specialized to carry items and gear, such as, luggage, supplies, clothing, shelter, gear, water, food, weapons, and the like. Some other embodiments of the walker of the invention might be specialized to carry specific items and gear, for example, children, pets, animals, animal carcasses, weapons, or fishing gear. Embodiments of the walker of the invention are specialized for climbing and descending hills, even steep hills on rugged trails transporting items and gear.

Embodiments of the walker of the invention have outside wheel diameter preferably greater than 5 inches. Wheels are part of a level system centered on the wheel hub. So, larger diameters have a longer level arm which can smooth travel over uneven and rugged surfaces. Larger diameter wheels also have radial momentum which can smooth travel of rugged and uneven surfaces. For rugged trails or use on uneven surfaces, the wheels diameters will advantageously be greater than 5 inches, for example, advantageously greater than 10 inches in outside diameter but no greater than 40 inches in outside diameter.

Embodiments of wheels of the walker of the invention are a rim and tire design similar to standard ride-on bicycles with many designs a wide variety of which are known in the ride-on bicycle art. FIGS. 1-4 show the location of the rims 8, spokes 7 and tires 10. The wheels 6 of a walker of the invention specialized for trail use may be specialized for lightweight with many designs a wide variety of which are known in the ride-on bicycle art. Embodiments of the rims 8 of the walker of the invention are metal, plastic, or fiber reinforced plastic with many designs a wide variety of which are known in the ride-on bicycle art. Embodiments of the wheels of the walker of the invention may have any number of metal spokes, but they can be of other materials, for example, plastic spokes, wire spokes, and fabric spokes or rope spokes, with many types and designs a wide variety of which are known in the ride-on bicycle art. The number of spokes can vary over a wide range, for example, anywhere from two spokes to 60 spokes with many designs a wide variety of which are known in the ride-on bicycle art. For example, spokeless wheels are known in the art of ride-on bicycles, embodiments of walkers of the invention can use spokeless wheels. Embodiments of the tires 10 of the walkers of the invention can be air filled rubber and similar to standard ride-on bicycle tires a wide variety of which are known in the ride-on bicycle art, or solid rubber, but other embodiments of tires 10 of walkers of the invention can use other materials and designs, and they may be specialized for specific uses. For example, some embodiments of the tires might be smooth for paved walkways and smooth surface use and other embodiments knobbed for rugged trail use. Another example is wider tires could be beneficial under some use conditions, for example, sandy trail conditions and tires with spikes for travel in snow conditions. Many embodiments of walkers of the invention will use components similar to or the same as ride-on bicycles a wide variety of which are known in the ride-on bicycle art.

Embodiments of the walker of the invention will be sized for average sized adults and other embodiments sized for smaller adults and for children. Typically, a walker of the invention specialized for an average sized adult will use larger wheels than a walker of the invention specialized for child use.

Embodiments of the walker of the invention may have refinements, such as, the walker structure might be used as part of a shelter support structure. The shelters can be constructed from nylon or other materials commonly used for backpacking shelter construction. The shelter can be erected using the walker of the invention as part of the support of the shelter. In addition to the walker, there may be further pieces of support structure for the shelter. A non-limiting example of additional pieces is tent pole like structures that work together with the walker to complete the support structure for a shelter.

A further embodiment is a walker of the invention that can be used by handicapped persons on trails in the National Parks and National Wilderness Areas. National Parks and National Wilderness Areas currently have restrictions against mechanical devices on park trails, but restrictions are lifted if the device is needed for medical or handicapped use. The National Park rules for mechanical devices are detailed in a Department of Interior publication titled, "All In. Accessibility in the National Park Service," 2015-2020, which is incorporated herein by reference.

A further embodiment is a walker of the invention that can be used by handicapped persons on trails in the National Wilderness areas or other areas restricting the use of mechanical devices, for example, state parks, county parks and city parks. National Wilderness areas and certain other areas have restrictions against the use of mechanical devices on trails, but those restrictions are lifted if the device is needed for medical or handicapped use. The rules in USDA areas are discussed in, "Accessibility Guidebook for Outdoor Recreation and Trails," by USDA, April 2012 which is incorporated herein by reference.

Embodiments of the walker of the invention may have a "kickstand", auxiliary wheel, or other mechanism for staying upright when not being held by an operator.

Embodiments of a walker of the invention may have a foot rest or seat. The seat may be a fold out seat and the foot rest a fold out design. Such additions might be useful for downhill travel or level travel or for resting. With such additions the walker of the invention might be temporarily ridden on while the walker is coasting downhill or coasting on level ground or by kick locomotion like a child's scooter.

Further embodiments of the walker of the invention have optional racks and optional carriers. FIGS. 1-4 show non-limiting locations of the optional racks 2 and optional item and gear carriers 1. In particular, a front wheel rack or a side rack are possible locations not depicted in FIGS. 1-3. Non-limiting examples of carriers are baskets, packs, racks and panniers for packing and carrying items and gear, such as, luggage, supplies, clothing, shelter, gear, water, food, weapons, and the like. A further embodiment is a walker of the invention where the optional rack and carrier locations are optimized for various uses, for example, for travel on rugged or non-rugged trails, for travel in paved walkways, or for travel inside buildings. The racks and carriers can be made of metal, fabric, plastic or other materials known in the ride-on bicycle art. The racks and carriers might be the same or similar to the wide variety known in the ride-on bicycle art. The optional carriers can be packs, for example, nylon backpack type or pannier construction that attach to racks. The optional carriers are optionally made of or protected by a mesh or wire mesh that are varmint resistant to protect against varmint damage. Some of the carriers may be bear resistant containers.

Embodiments of the walker of the invention may have detachable packs or daypacks that serve as item and gear carriers while on the walker, but then are detachable for other uses. That way the walker of the invention could be a mobile base-camp where side trips could be done with removal backpacks, for example, fishing side trips, hunting side trips or climbing side trips.

Embodiments of the walker of the invention might be useful to carry items and gear for family outings, such are day outings, overnight outings, and backpacking trips. The ability for walkers of the invention to pack items and gear would be advantageous for family outings.

Further embodiments are walkers of the invention that can be used by handicapped persons on airplanes, buses, cars, trains and other transportation uses.

Embodiments of the walker of the invention may have various adjustable components which may also be "quick release" which means levers for rapid component adjustment or component removal. Non-limiting examples are adjustable and possible quick release wheels, handlebars, elbow rests, foot rests, seats, racks and carriers. Non-limiting examples of height adjustable components are handlebars, elbow rests, foot rests and seats. For example, as shown in FIGS. 1 and 3, the elbow rest 3 can be attached to the frame 9 via a height-adjustable component 16. A further embodiment is adjustable or removable components which could be useful on rugged trails to negotiate tough or narrow trail sections.

Embodiments of a walker of the invention may have a structure that can fold. Folding means a frame configuration that can rapidly be compacted for easy transportation on, for example, trains, buses, trucks, cars and airplanes and for storage. Folding bicycles are well known in the ride-on bicycle art. Walkers of the invention could have similar designs to such folding bicycles only without a drivetrain. Such folding walkers would be advantageous for travel and storage and within the scope of the claims.

Preferred embodiments of the walker of the invention are specialized for lightweight, for example, the design can be for lightweight, and the materials of construction can be lightweight, a wide variety of which are known in the ride-on bicycle art. Lightweight tires and components may be advantageous for the walker of the invention and are known in the ride-on bicycle art.

FIGS. 1-3 show non-limiting frame shapes 9 for a walker of the invention. Embodiments of the frame shape and size of the walkers of the invention can vary over a wide range and many designs suitable of walkers of the invention will be similar to ride-on bicycle frames a wide variety of which are known in the ride-on bicycle art. For example, as shown in FIGS. 1-3, the frame 9 can include the longitudinal centerline bar 15. The frame may be specialized for certain applications. For example, rugged trail use with heavy loads might need a stronger frame than non-rugged trail use or paved walkway use. The frame shape and location of the supports can vary in any way with no limitations on the location of the frame supports, the wheel and hub attachments, or the support design. The frame supports and tubes can be round or square, wide or narrow, or anything in between.

Frame designs of the walker of the invention are flexible and may not be similar to ride-on bicycles. For example, an embodiment of the walker of the invention is a non-linear front to back frame design which allows the operator to better align their center to the weight center of the walker. A further embodiment is a walker of the invention where the frame comes over the operator rather than to the side of the operator.

Embodiments of the frame of the walker of the invention can be constructed from materials similar to or the same as the wide variety known in the ride-on bicycle art. Non-limiting examples are, iron, steel, aluminum, chromaloy (chromium, molybdenum, steel alloy) steel, and plastics.

Other embodiments are walkers of the invention with frames specifically designed for lightweight. Since pedals, drivetrain for non-electrical motor assist embodiments and seat are not needed on the walker of the invention, their elimination will reduce weight. Also, since the walker of the invention is not necessarily designed to be ridden and carry the weight of a person, the frame structural components might be lightened. A further embodiment is the walker of the invention is made of lightweight materials known in the art of ride-on bicycles. Non-limiting examples are aluminum, chromoly (chromium, molybdenum, steel alloy), steel, plastic, reinforced plastic, or polymer matrix composite with reinforcing fibers of carbon fiber, fiberglass, aramid fiber, or other reinforcing fiber.

Figure 4:
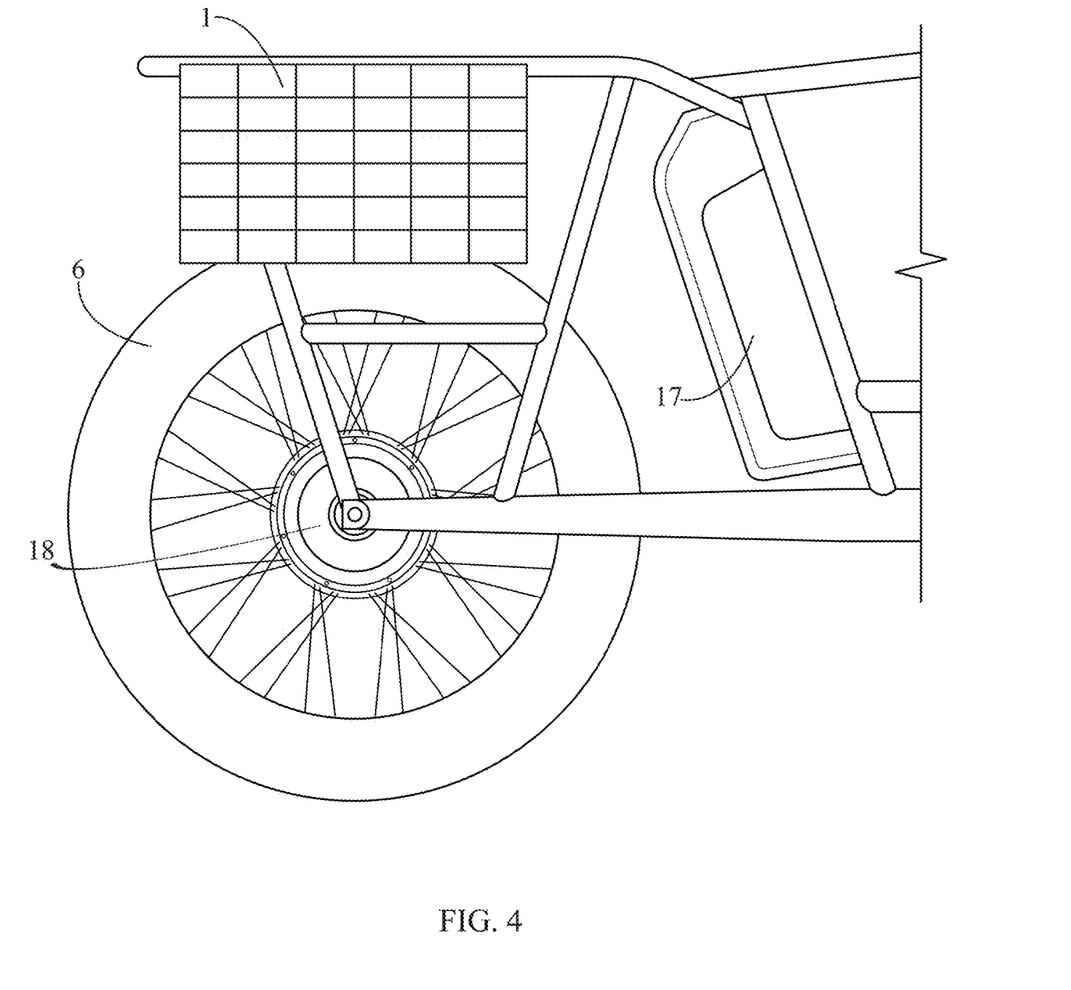
FIG. 4 shows a partial, zoomed-in side view of the walker in FIG. 3.

A further embodiment is a walker of the invention specialized for pushing rather than riding on with an electric or gasoline assist motor assist to assist the pushing burden, especially for uphill and level travel, but this walker of the invention does not have pedals to operate the drivetrain. If electric, the walker of the invention may be powered by solar cells and batteries or just batteries. Other embodiments of walkers of the invention specialized for pushing rather than riding on have electrical motor Power assist would be especially advantageous for handicapped persons. For example, as shown in FIGS. 3 and 4, the walker of the invention can include the electric motor 18, which can be attached to the hub of the rear wheel 6, and the battery 17, which can be attached to the frame 9. The National Park, National Wilderness areas and other areas restricting mechanical devices permit electrical powered locomotion on devices used on trails by handicapped persons. Certain assist devices can incorporate smart features, such as, providing only the amount of power needed for powered assist. Embodiments of the walker of the invention that are power assisted by an electrical or gasoline motor will not have pedals attached to the power drivetrain.

The walker of the invention will have a braking mechanism. Embodiments of the mechanism will be a rim brake design, disk brake design, an in hub friction design or similar devices or other designs known in the art of ride-on bicycles. These braking mechanism designs will be similar to or the same as for a ride-on bicycles and are required for safe use of walkers of the invention. The locations and design of the brake levers, the rim brake mechanism, or the disk brake mechanism are not shown, but the locations, types of devices and designs will be the same or similar to the wide variety known in the ride-on bicycle art. The braking mechanisms will be hand operated by levers and might use cables controls or might use electrical controls in place of cable controls. Cables can be used as part of the brake mechanisms or to control the brake mechanisms. Especially useful are the cables like the types known in the art of ride-on bicycles. Some embodiments of the braking mechanism for uphill and downhill travel to prevent runaway and backsliding might have adjustable and settable controls on the braking mechanisms which can be adjusted to the incline of the terrain. The controls may include a runaway protective device which applies stopping force to the walker of the invention when grip is lost on the walker on inclined terrain. The runaway protective device might be electrically operated.

A further embodiment is a walker of the invention with an optional ratchet mechanism or similar mechanisms to those used on chain drive ride-on bicycles to allow uphill and downhill travel to prevent run away, backsliding or forward-sliding. The ratchet mechanism may use a chain or a belt as part of the mechanism but no pedals. Cables can be used as part of the mechanisms or to control the mechanisms. The ratchet mechanism may be adjustable, settable to the pitch of the terrain using cables, other mechanisms, or electrical. Optionally, the ratchet device design may include a runaway protective device which applies stopping force to the walker of the invention to prevent run away in case of losing grip on the walker on inclined terrain. The optional runaway protective device might be cable or electrically operated.

A further embodiment is a walker of the invention with lights for travel at night or better visibility in the day. The lights may flash for certain applications. The lights may be in the front and back of the walker of the invention.

The above detailed description of exemplary embodiments of the invention is provided to illustrate the various aspects of the invention, and is not intended to limit the scope of the invention thereto. Persons of ordinary skill in the art will recognize that certain modifications can be made to the described embodiments without departing from the invention. All such modifications are intended to be within the scope of the appended claims.

What is claimed is:

1. A walker for pushing and walking to the side of, comprising:
   a bicycle frame comprising a longitudinal centerline bar;
   two inline wheels coupled to the bicycle frame;
   wherein the bicycle frame defines a wheelbase between the two inline wheels;
   a handlebar steering mechanism coupled to a first end of the bicycle frame; and
   an elbow rest coupled to the longitudinal centerline bar of the bicycle frame between the handlebar steering mechanism and a second end of the bicycle frame,
   wherein the elbow rest is configured for a user to lean on while walking to the side of the walker; and
   wherein the walker has no drivetrain.

2. The walker of claim 1, wherein the bicycle frame and the two inline wheels are configured for use on off-road trails.

3. The walker of claim 1, wherein the elbow rest comprises a height adjustable component for adjusting the distance between the elbow rest and the longitudinal centerline bar.

4. The walker of claim 1, further comprising a brake mechanism coupled to the handlebar.

5. The walker of claim 4, wherein the brake mechanism comprises adjustable and settable controls that can be adjusted to an incline of an inclined terrain to reduce forward-sliding during downhill travel on the inclined terrain.

6. The walker of claim 4, wherein the brake mechanism is configured to prevent runaway during downhill travel on an inclined terrain by applying a stopping force to the walker when the handlebar is released.

7. The walker of claim 1, further comprising a seat or foot rest.

8. The walker of claim 1, further comprising a rack coupled to the frame, wherein the rack is configured to carry gear.

9. The walker of claim 1, wherein the walker reduces an amount of weight carried by a spine of a user.

10. The walker of claim 1, wherein the wheelbase is between 15 and 60 inches.

11. The walker of claim 1, wherein the two inline wheels each have an outside diameter of between 5 inches and 40 inches.

12. A walker for pushing and walking to the side of, comprising:
   a bicycle frame;
   two inline wheels coupled to the bicycle frame, wherein each of the respective inline wheels has an outside diameter that is greater than 10 inches;
   an electric motor coupled to one of the two inline wheels, the electric motor being powered by a battery;

wherein the bicycle frame defines a wheelbase between the two inline wheels;

a handlebar steering mechanism coupled to a first end of the bicycle frame;

a first brake mechanism coupled to the handlebar, the first brake mechanism comprising adjustable and settable controls that can be adjusted to an incline of an inclined terrain to reduce forward-sliding during downhill travel on the inclined terrain;

wherein the walker has no pedals.

13. The walker of claim 12, wherein the bicycle frame and the two inline wheels are configured for use on off-road trails.

14. The walker of claim 12, further comprising a second brake mechanism coupled to the handlebar, the second brake mechanism configured to prevent runaway during downhill travel on an inclined terrain by applying a stopping force to the walker when the handlebar is released.

15. The walker of claim 12, further comprising a seat or foot rest.

16. The walker of claim 12, further comprising a rack coupled to the frame, wherein the rack is configured to carry gear.

17. The walker of claim 12, wherein the walker reduces an amount of weight carried by a spine of a user.

18. The walker of claim 12, wherein the wheelbase is between 15 and 60 inches.

19. A walker for pushing and walking to the side of, comprising:

a bicycle frame comprising a longitudinal centerline bar;

two inline wheels coupled to the bicycle frame;

an electric motor coupled to one of the two inline wheels, the electric motor being powered by a battery;

wherein the bicycle frame defines a wheelbase between the two inline wheels;

a handlebar steering mechanism coupled to a first end of the bicycle frame;

an elbow rest coupled to the longitudinal centerline bar of the bicycle frame between the handlebar steering mechanism and a second end of the bicycle frame, wherein the elbow rest is configured for a user to lean on while walking to the side of the walker; and wherein the walker has no pedals.

20. The walker of claim 19, wherein the elbow rest comprises a height adjustable component for adjusting the distance between the elbow rest and the longitudinal centerline bar.

21. The walker of claim 19, further comprising a brake mechanism coupled to the handlebar.

22. The walker of claim 21, wherein the brake mechanism comprises adjustable and settable controls that can be adjusted to an incline of an inclined terrain to reduce forward-sliding during downhill travel on the inclined terrain.

23. The walker of claim 21, wherein the brake mechanism is configured to prevent runaway during downhill travel on an inclined terrain by applying a stopping force to the walker when the handlebar is released.

24. The walker of claim 19, further comprising a rack coupled to the frame, wherein the rack is configured to carry gear.

25. The walker of claim 19, wherein the walker reduces an amount of weight carried by a spine of a user.

* * * * *

UNITED STATES PATENT AND TRADEMARK OFFICE
CERTIFICATE OF CORRECTION

| | |
|---|---|
| PATENT NO. | : 11,571,354 B2 |
| APPLICATION NO. | : 16/551428 |
| DATED | : February 7, 2023 |
| INVENTOR(S) | : Jack Boyd |

It is certified that error appears in the above-identified patent and that said Letters Patent is hereby corrected as shown below:

On the Title Page

After item (65) and before item (51), insert:
-- Related U.S. Application Data
Provisional application No. 62/765,415, filed on Aug. 25, 2018. --

Signed and Sealed this
Sixteenth Day of January, 2024

Katherine Kelly Vidal
*Director of the United States Patent and Trademark Office*